May 17, 1960
F. RICHARDSON
2,936,861
SHEET METAL CONNECTOR
Filed April 26, 1957
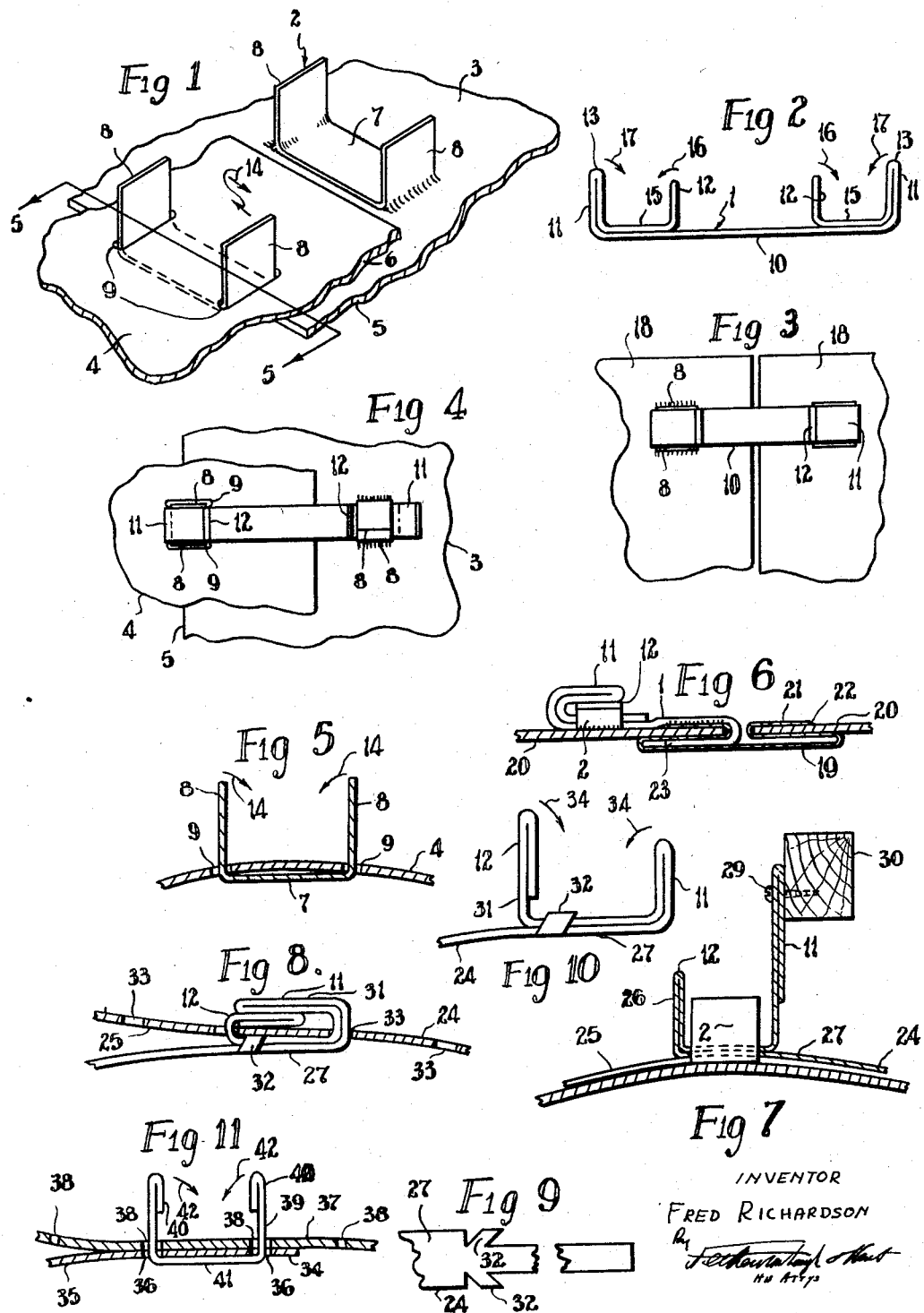
INVENTOR
FRED RICHARDSON

United States Patent Office 2,936,861
Patented May 17, 1960

2,936,861

SHEET METAL CONNECTOR

Fred Richardson, Winnipeg, Manitoba, Canada

Application April 26, 1957, Serial No. 655,428

1 Claim. (Cl. 189—35)

My invention relates to new and useful improvements in sheet metal connectors, the principal object and essence of my invention being to provide a device of the character herewithin described which comprises a cleat having tabs formed on both ends thereof and a clip secured to the components being connected together, said clip including a pair of flanges. The cleat engages the clip whereupon the flanges may be bent over to engage the clip and then the tabs bent over the flanges to secure the whole together.

Another object of my invention is to provide a device of the character herewithin described which is adapted for use either with circular or rectangular cross-sectioned duct work, adjacent sheet metal cabinets, adjacent planar sheets, et cetera.

Another object of my invention is to provide a device of the character herewithin described in which the inner surface of the duct work is left clear and smooth of any fastening means.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a fragmentary perspective view of two engaging surfaces of a circular duct showing the clip secured thereto.

Figure 2 is a side elevation of the cleat adapted to be received by the clips in Figure 1.

Figure 3 is a fragmentary side elevation of a pair of cabinet corners being held together by my connector.

Figure 4 is a top plan view of Figure 1 with the cleat shown in Figure 2 in position, it being understood that the left-hand portion is closed completely whereas the right-hand portion is only partially closed.

Figure 5 is a section substantially along the line 5—5 of Figure 1, but with only one component being illustrated.

Figure 6 is a fragmentary side elevation of two portions of duct work being held together by a conventional sliding cleat, but incorporating my device for securement.

Figure 7 is a fragmentary side elevation of a conduit supporting band utilizing my invention therein.

Figure 8 is a fragmentary side elevation, sectioned in part, of a further conduit support band.

Figure 9 is a fragmentary top plan view of one end of Figure 8 showing the band before the cleat is formed on one end thereof.

Figure 10 is a fragmentary side elevation of Figure 9, but showing the cleat formed thereon.

Figure 11 is a fragmentary perspective view of an alternative embodiment of the conduit support band shown in Figure 8.

In the drawings like characters of reference indicate corresponding parts in the different figures.

Conventional duct work conduit is normally held together by means of sliding cleats and the like or else screws or rivets are utilized.

While sliding cleats may be satisfactory under certain conditions such as rectangular cross sectioned duct work, they are almost impossible to use on circular cross sectioned duct work. Furthermore, the forming of the cleats and the ends is an arduous job and the resultant junction is not usually satisfactory.

My invention overcomes these disadvantages by providing a relatively simple cleat connection which may readily be attached under a variety of conditions and irrespective of whether the ducts are circular or rectangular in cross section. Furthermore, the connector can readily be incorporated within a duct supporting band which not only clamps the sections of duct together, but can be utilized for suspending same.

Furthermore, the connector can be used o nadjacent flat sheets and also may be used readily in connecting together adjacent sheet metal lockers or chests.

Proceeding therefore to describe my invention in detail, reference should be made to the accompanying drawings in which it will be seen that my invention consists of two principal components, namely the cleat collectively designated 1 and the clip collectively designated 2.

Dealing first with the invention as illustrated in Figures 1, 2 and 5, I have illustrated in Figure 1 two adjacent sections 3 and 4 of duct work, it being understood that the end 5 of the section 3 is adapted to overlap the end 6 of section 4.

The clip collectively designated 2 consists of a base 7 and a pair of parallel and spaced upstanding flanges 8. The right-hand clip, with reference to Figure 1, is soldered to the outer surface of section 3, but the left-hand clip is attached in an alternative manner. A pair of spaced and parallel slits 9 are formed through the portion 4 and the flanges 8 are inserted upwardly through the slits as shown in Figure 5, it being understood that the inner end 5 of the section 3 maintains the clip in position until the fastening has been secured.

The cleat collectively designated 1 is formed from an elongated strip of sheet metal 10, which is reversely bent at each end thereof to form a pair of spaced and parallel upstanding tabs 11 and 12. To form these tabs, the end is first bent upwardly at right angles and is then doubled upon itself as at 13, the end following back down and along the strip to terminate in the upturned tab 12.

In operation, the clips are secured to the adjacent components 3 and 4 as hereinbefore described and the components are overlapped one with the other so that the clips 2 are in alignment.

The cleat 1 is then laid across across the junction between the components with the tab areas of the cleat resting between the flanges 8 of the clips 2. It will be observed that the flanges 8 and the tabs 11 and 12 are at right angles with one another when in this position.

The flanges 8 are then bent inwardly in the direction of arrows 14 thus embracing the portions 15 of the cleats between the tabs 11 and 12. Tab 12, which is slightly shorter than tab 11 is then bent downwardly and inwardly in the direction of arrow 16 to overlie the flanges 8 and finally tab 13 is bent downwardly and inwardly in the direction of arrow 17 to overlie tab 12, the final results being illustrated in the left-hand portion of Figure 4.

The right-hand portion of Figure 4 shows the cleat in position with the flanges 8 bent inwardly to cover the portion 15 of the cleat, it being understood that the tabs 11 and 12 are then bent over as hereinbefore described.

Figure 3 illustrates the same form of connection, but being utilized in the junction of two cabinets or the like illustrated by the reference character 18. In this connection, as the cleat and clips are similar, similar reference characters have been given to the components.

Figure 6 shows an embodiment which is particularly designed for use with the conventional sliding cleat component 19 into which engage the edges 20 of the adjacent sheets or conduits. Unless other means are provided, no longitudinal stress could be placed upon such a junction as the ends would be disengaged. However, by anchoring one end 21 of the cleat to the edge 20 by means of solder 22, a connector such as that illustrated can be utilized. Alternatively, such a connector may be used upon either side of the cleat 19.

The clip 2 and the cleat 1 are similar as hereinbefore described, inasmuch as the cleat is provided with the tabs 11 and 12 upon one end thereof.

However, the opposite end of the cleat is formed into a hook 23 which is adapted to engage within one side of the conventional cleat 19 as illustrated in Figure 6, thus holding the component firmly into position with the conventional cleat 19.

Figure 7 shows an embodiment particularly suitable for incorporation within a strap 24 adapted to surround the junction between adjacent conduits, usually round conduits. In this embodiment, the clip 2 is secured upon one end 25 of the strap 24 by either methods illustrated in Figure 1.

The cleat 26 is formed upon the opposite end 27 of the strap 24 by reversely bending this end to form the tabs 11 and 12. In this instance, tab 11 is made considerably longer than heretofore so that it may be secured as by nail or screw 29 to a supporting member 30. Finally, Figures 8, 9 and 10 show a strap 24 which is adjustable in girth. The cleat 31 illustrated in Figures 8 and 10 is formed by reversely bending one end 27 of the strap after forming the end as illustrated in Figure 9. When the reverse bends are made thus forming the tabs 11 and 12, the shoulder portions 32 are then bent over to hold the tabs securely.

The opposite end 25 of the strap is provided with a plurality of spaced and parallel slits 33, said slits being so positioned as to take the tabs 11 and 12.

The strap is placed around the components being held and positioned so that the tabs 11 and 12 enter a pair of adjacent slits 33 whereupon these tabs may be bent downwardly and inwardly in the direction of arrows 34 as hereinbefore described.

Finally, reference should be made to Figure 11 which shows an alternative embodiment for a strap having adjustable girth and utilizes a cleat similar to those illustrated in Figures 1 and 5. Upon one end 34 of the strap 35, I punch a pair of apertures 36 and upon the opposite end 37 I have punched a plurality of spaced apertures 38.

A cleat 39 consists of the two upstanding ends 40 and the base portion 41. The strap ends are brought together and the cleat inserted through matching slits or apertures 36 and 38 whereupon the ends or legs 40 are bent inwardly in the direction of arrows 42 to overlap one another and hold the straps firmly together.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A connector for two sheet metal components disposed in adjacent relation, said connecter comprising in combination a pair of substantially U-shaped clips formed from deformable sheet material and each including a flat base portion and a pair of bendable flanges extending normally perpendicularly from opposite sides of said base portion, the base portions of said clips being secured to two sheet metal components with the clips disposed in mutually spaced relation wherein the flanges at the opposite sides of their base portions are co-planar, and a cleat formed from deformable sheet material and comprising a strip having a flat elongated intermediate portion constituting a base and a pair of reversely angulated end portions of a U-shaped configuration superposed on the end portions of said base, said reversely angulated end portions providing an outer pair of bendable tabs at the ends of said base, flat bight portions extending inwardly along the base from said outer tabs, and an inner pair of bendable tabs disposed at the inner ends of said bight portions, said outer and inner tabs being normally perpendicular to said base and said cleat extending longitudinally between said pair of clips with the end portions of said base disposed on the base portions of the clips between said flanges and with said outer and inner tabs disposed respectively at the outside and inside of the clips, said flanges being bent inwardly upon said flat bight portions and said outer and inner tabs bent inwardly upon the bent flanges to hold the connector assembled.

References Cited in the file of this patent

UNITED STATES PATENTS

| | | |
|---|---|---|
| 359,324 | McGill | Mar. 15, 1887 |
| 970,989 | Clarke | Sept. 20, 1910 |
| 1,086,442 | Cornelius | Feb. 10, 1914 |
| 1,190,759 | Harrington | July 11, 1916 |
| 1,436,724 | Prudden | Nov. 28, 1922 |
| 1,728,964 | Gross | Sept. 24, 1929 |
| 1,804,472 | Leslie | May 12, 1931 |
| 2,463,306 | Potts | Mar. 1, 1949 |

FOREIGN PATENTS

| | | |
|---|---|---|
| 466,740 | Canada | July 18, 1950 |